United States Patent [19]
Rode

[11] Patent Number: 5,565,874
[45] Date of Patent: Oct. 15, 1996

[54] EXPANDABLE, MULTI-LEVEL INTELLIGENT VEHICLE HIGHWAY SYSTEM

[75] Inventor: Melvin A. Rode, West Bloomfield, Mich.

[73] Assignee: Siemens Automotive Corporation, Auburn Hills, Mich.

[21] Appl. No.: 307,952

[22] Filed: Sep. 16, 1994

[51] Int. Cl.$^6$ .................................................. G01S 3/02
[52] U.S. Cl. .................... 342/457; 364/449; 340/990; 340/995
[58] Field of Search ..................... 364/449; 342/957; 340/910, 988, 990, 995

[56] References Cited

U.S. PATENT DOCUMENTS

| | | | |
|---|---|---|---|
| 5,206,811 | 4/1993 | Itoh et al. | 364/449 |
| 5,291,414 | 3/1994 | Tamai et al. | 364/449 |
| 5,311,434 | 5/1994 | Tamai | 364/449 |
| 5,323,321 | 6/1994 | Smith, Jr. | 364/449 |
| 5,353,034 | 10/1994 | Sato et al. | 342/357 |
| 5,422,812 | 6/1995 | Knoll et al. | 364/449 |
| 5,450,343 | 9/1995 | Yurimoto et al. | 364/449 |

*Primary Examiner*—Thomas H. Tarcza
*Assistant Examiner*—Dao L. Phan
*Attorney, Agent, or Firm*—Russel C. Wells

[57] ABSTRACT

An expandable multi-level intelligent vehicle highway navigation system 11 for a motor vehicle having an input device 34 that is adapted to load the segments 21 of a route into a memory means 32. A controller 30 receives a wheel pulse input 28 for distance and electric power 36 from the vehicle and controls the memory 32 and a plurality of displays 13 for displaying the segments 21 of the route, graphic symbols for vehicle direction and segment distance. The controller 30 may be adapted to control additional units such as infrared transceivers 58, RF transceivers 44, GPS devices 52, routing computers 48, map data bases 50, compass 56, etc. and various miscellaneous inputs 54 to build the basic unit into a more complex routing system.

3 Claims, 3 Drawing Sheets

EXPANDABLE, MULTI-LEVEL INTELLIGENT VEHICLE HIGHWAY SYSTEM

FIELD OF INVENTION

This invention is directed to systems for use in Intelligent Vehicle Highway Systems in general and more particularly to an vehicle unit having capability for expansion and adding features.

BRIEF SUMMARY OF THE INVENTION

1. Background of the Invention

There are several different types of vehicle navigational systems. The first system makes use of stored map displays wherein the maps of a predetermined area are stored in the in-vehicle computer and displayed to the vehicle operator or driver. The maps, knowing the location where the vehicle started and where it is to go, will highlight the direction and the driver will have to read the display and follow the route. One such stored map display system offered by General Motors on their 1994 Oldsmobile, uses Global Positioning System (GPS) satellites and advanced dead reckoning techniques to determine a precise location. Some of the companies that are involved in GPS are Pioneer Electronic Corporation having U.S. Pat. No. 5,276,451 issued Jan. 4, 1994, entitled Navigation System with Navigational Data Processing" and U.S. Pat. No. 5,210,540 issued May 11, 1993, entitled "Global Positioning System". The vehicle has communication means for receiving data in the form of radio waves from satellites giving the location of the communication means in latitude and longitude data. The driver enters details of the desired destination into an on-board or in-vehicle, computer in the form of specific address, a road intersection, etc. The stored map is displayed and the operator then pinpoints the desired destination. The on-board computer then calculates the most efficient route and then displays on a display unit, the distance to and the direction of each turning maneuver in easy-to-read graphics and also includes a voice prompt.

Another system, described in U.S. Pat. No. 5,274,560 issued to Charles LaRue on Dec. 28, 1993, entitled "Sensor Free Vehicle Navigation System Utilizing A Voice Input/output Interface For Routing A Driver From His Source Point To His Destination Point" does not use GPS and has no sensing devices connected to the vehicle. The routing information is contained in a device that is coupled to the CD player of the vehicle's audio system. Commands are entered into the system via a microphone and the results are outputted through the vehicle's speakers. The vehicle operator spells out the locations and destinations, letter by letter. The system confirms the locations by repeating whole words. Once the system has received the current location and destination, the system develops the route and calculates the estimated time. The operator utilizes several specific performance commands, such as "Next", and the system then begins to give segment by segment route directions.

Still another system, such as the Siemens Ali-Scout™ system, requires that the driver key-in the destination address coordinates into the in-vehicle computer. A compass means located in the vehicle then gives a "compass" direction to the destination address. Such a "compass" direction is shown in easy-to-read graphics as an arrow on a display unit indicating the direction the driver should go. Along the side of the road are several infrared beacon sites which transmit data information to the properly equipped vehicle relative to the next adjacent beacon site. From all of the information received, the in-vehicle computer selects the desired beacon data information to the next beacon and displays a graphic symbol for the vehicle operator to follow and the distance to the desired destination. There is no map to read; both a simple graphic symbol and a segment of the route is displayed and a voice prompt telling the vehicle operator when to turn and when to continue in the same direction. Once the program begins, there is no operator involvement required.

U.S. Pat. No. 4,350,970, assigned to Siemens AG and issued on Sep. 21, 1982 to yon Tomkewitsch and entitled "Method for Traffic Determination in a Routing and Information System for Individual Motor Vehicle Traffic" describes a method for traffic management in a routing and information system for motor vehicle traffic. The system has a network of stationary routing stations each located in the vicinity of the roadway which transmit route information and local information concerning its position to passing vehicles. The trip destination address is loaded by the vehicle operator into an onboard device in the vehicle and by dead reckoning techniques a distance and direction graphic is displayed. The first routing station which the vehicle passes transmits a message to the vehicle with route data to the next routing station. The vehicle receives the message and as it executes the several vector distances in the message it accumulates time and distance which it transmits to the second routing station when it is interrogated by the second routing station. In this manner, traffic management is updated in real time and the vehicles are always routed the "best way". Of course the best way may be the shortest way, the less traveled way, the cheapest way or any combination of these plus other criteria. U.S. patent application Ser. No. 08/258241 entitled "Vehicle Navigation and Route Guidance Systems with Central Upgradable Database", filed on Aug. 3, 1994, and assigned to a common assignee is an improvement over the above described system.

SUMMARY OF INVENTION

Two of the above described systems require elaborate invehicle superstructures, all of which are costly, to rely on internal and external sources signals to the vehicle. The third system does not utilize any external sources or any sensor inputs from the vehicle. The present system provides a building block approach from a very simple system for route guidance in IVHS to a full up complicated system affording many options. The basic requirements of an IVHS system are a keyboard, a display, a computing system, a known location button, a wheel pulse input and of course, battery power. The wheel pulse input and battery power are already available on the vehicle.

The operator enters the route which has been previously determined into the computer. The operator then positions his vehicle at the beginning of the route. Each segment of the route, including its mileage will be sequentially displayed on the display. The wheel pulse input to the computer is used in measuring the distance traveled and will operate, in the preferred embodiment, to count down the distance shown on the display. The display indicates to the operator when he should turn or change direction and what the new direction should be.

In order to accomplish the above advantages, there is described herein an intelligent vehicle highway navigation system for a vehicle having wheel pulse input signal generator such as a odometer electronic signal device, and a power supply in the infrastructure of the vehicle. The system has a memory unit adapted to contain a plurality of predetermined routes for traveling from an initial location to a destination location and in addition is adapted to receive additional routes each comprising a plurality of routing segments. A display unit displays graphic symbols indicating the direction of travel of the vehicle including the direction that the vehicle should be turned at the end of each routing segment. A data display unit displays alphanumeric symbols describing each routing segment of the route and the distance of each routing segment so that the vehicle operator is informed of the beginning and the end of each routing segment. An input device unit for inputting into the memory unit the routing segments for a route and for inputting the desired designation identification for selecting one of the predetermined routes. A controller is adapted to receive the signals generated by the wheel pulse input generator and the power supply, and operates for organizing and operating the several units of the system to present successive routing segments of the desired route to the display units in response to the distance traveled.

DESCRIPTION OF THE DRAWINGS

These and other advantages will become obvious from the following description and drawings in which.

DETAILED DESCRIPTION

Figure 1:
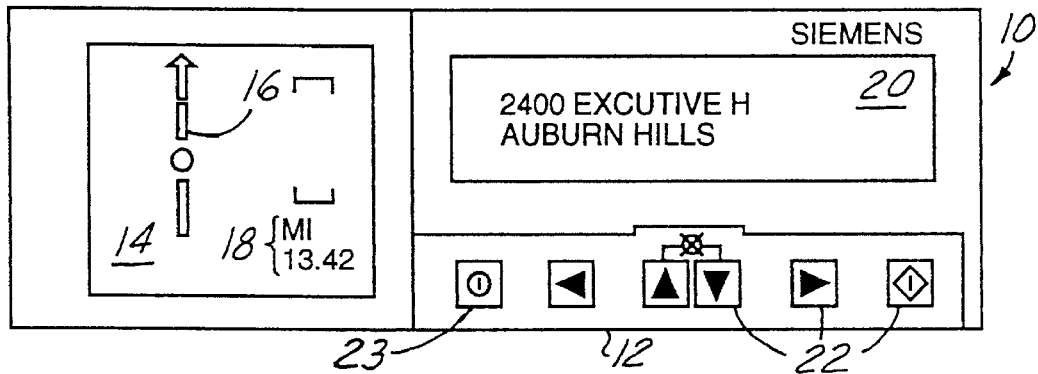
FIG. 1 is a front view of the display control unit.

Referring to FIG. 1, there is illustrated a display control unit 10 of an expandable intelligent vehicle highway navigation system 11 for motor vehicles that is low cost and, as will be shown has the capability of being expandable from a very simple to a very complex system. This unit 10 is contained in a housing 12 which is capable of being located in view of the driver but not in his driving sight distance. The display control unit 10 has a display 13 comprising first display or direction screen 14, shown on the left in the FIG., which displays an arrow or arrows 16 indicating the direction the vehicle is to take. Also located on the direction screen 14 and in the lower right corner, is a numerical indication 18 of the distance to travel in miles, kilometers, etc.; in this case 13.42 m to indicate miles and a count down bar for better visibility to the driver. Along with the visual indication of a turn, the unit 10 may have an audio means to indicate to the driver that the vehicle should turn by means of sound device such as chimes or other similar device.

Figure 4:
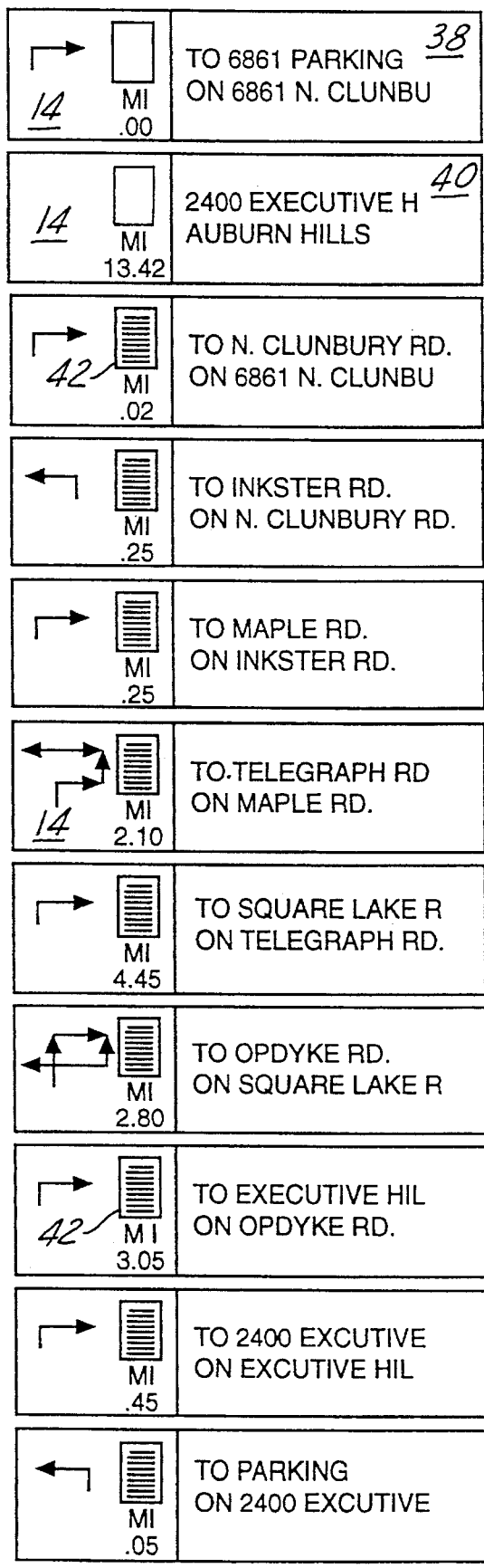
FIG. 4 is an example of the steps of programming a route in the basic display control system.

Located in the housing 12 and adjacent to the direction screen 14 is a second or data screen 20 which is a display that has two lines of sixteen alphanumeric characters each although more or less characters maybe used. The messages that are shown on the data screen 20 are routing segments 21 of the route and other alphanumeric information, some examples of which are illustrated in FIG. 4.

Figure 2:
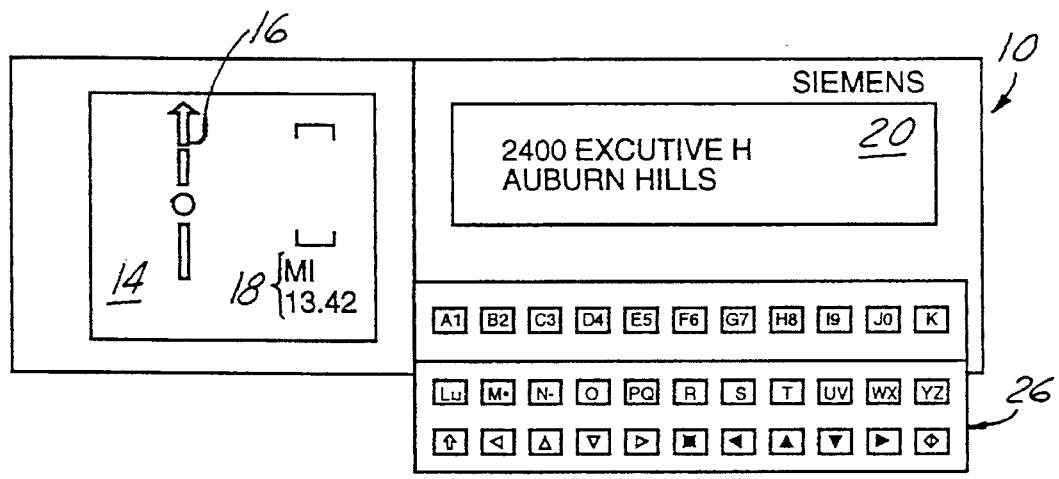
FIG. 2 is a front view of the display control unit with the keyboard input unit.

Below the data screen 20 are a series of operator controls 22 which include means for scrolling the data screen, turning the unit on and off 23 and other controls as required. In addition there is a known location button 24 which is located on the steering wheel or turn signal so that when activated as will hereinafter be described, the driver can operate the button. The unit 10 in FIG. 2 is the same unit as shown in FIG. 1 but is illustrated with the front cover flipped down displaying a modified alphanumeric keyboard 26 and other controls some of which are duplicates of those shown in FIG. 1.

Figure 3:
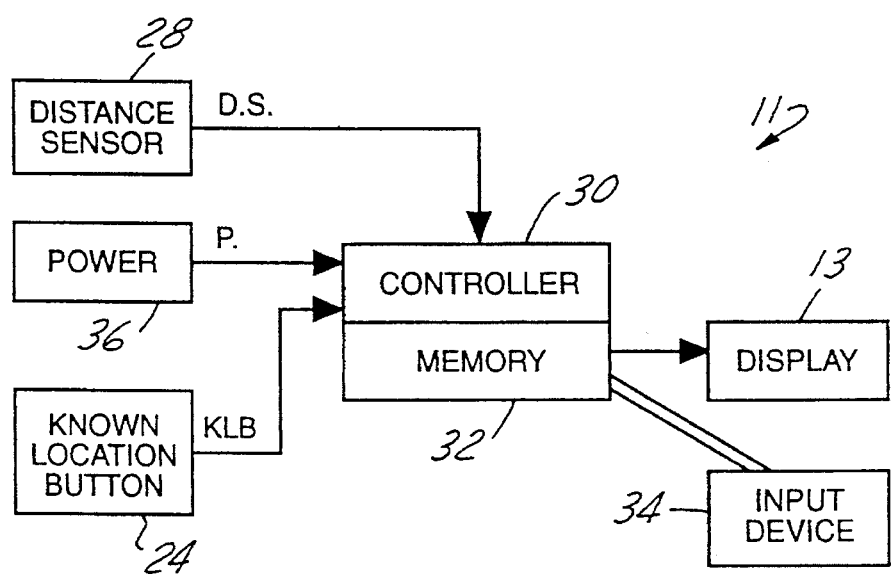
FIG. 3 is a block diagram of the basic display control system of the preferred embodiment.

FIG. 3 illustrates in block diagrammatic form the basic system of the preferred embodiment. The system comprises a wheel pulse generator 28 which functions as a distance or speed sensor; a housing as illustrated in FIGS. 1 and 2 having a controller 30, a memory, a known-location button 24, the first 14 and second 20 display screens; an input or driver interface 34 and a source of power 36. In the present embodiment, the basic display unit 10 of FIG. 1 is a portable device which is releasably mounted in the vehicle and connected by means of a connector to receive the necessary inputs from the vehicle such as the wheel pulse input generator or distance sensor 28, power 36, and any other controls such as ignition on and also may include a connector means for addressing the memory for storing the several routes as will be hereinafter described. The controller 30 provides the operating system for the unit including operating the displays 13.

The memory 32 is a non-volatile memory which may retain several different routes loaded therein for recall at any time. As will be shown, if the desired route is not stored in the memory, the vehicle operator pre-plans his route and loads the route, segment by segment 21, into the memory 32. As an example, in rental fleet applications, the fleet owner may install several routes to various known places from his rental location to such places as airports, hotels, train stations, public buildings, restaurants and other points of interest in the area as an aid to the rental driver who is not familiar with the area. As a part of each segment 21, the distance to be traveled along the segment, that is from the beginning to the end of the segment, is also loaded into the computer.

A wheel speed sensor is found in most vehicles and senses the passage of a tooth wheel which is typically coupled to the drivetrain of the vehicle. The output signal of the sensor is supplied to a pulse forming circuit, wheel pulse input generator 28, which takes the output signal of the sensor and forms digital pulses, which are inputted to the controller 30. These pulses are used to measure the distance traveled.

The known-location button 24 is typically activated when the vehicle has come to the end of a segment 21 and the display 14 indicates that there is still a distance to travel 18. The vehicle operator then will activate the known-location button 24 to cause the controller 30 to initialize the direction and data screens 14, 20 to the vehicle's present location and cause the next segment 21 of the route to be displayed on the data screen 20. The next segment has the location name of the present location and the location name of the next location where the vehicle will turn along with the distance to the turn which is shown on the distance screen 14.

In this system, and each of the next embodiments, the input device 34 is some form of a keyboard device such as a keyboard, or a computer. If the input is a computer, the driver can enter his route at some other location than in the vehicle and when he/she gets into the vehicle, the computer can be connected to the memory 32 and the route downloaded into the memory. The computer may have some form of an routing and map data program that will allow the operator to develop his unique route.

Referring to FIG. 4, there is illustrated the routing segments 21 to transport a vehicle from a beginning location 38 to a destination location 40. The first box shows the last message which was displayed, and in particular the message which was displayed when the ignition was turned off. In this example, the location is the place the vehicle is parked and is the beginning location 38. The vehicle operator then scrolls up the various routes which are located in the computer until the name of the desired destination location 40 is on the screen 20. When the destination location 40 is selected, the direction screen 14 shows the distance that the trip will cover.

The next segment 21 is brought into view by depressing the known-location button 24. This segment 21 tells the vehicle operator to go from his parking place to the street a distance of 0.02 mi and when he arrives at the street, he must make a right turn. The bar graph 42, located above the distance measurement is a visual signal showing the distance counted down to the turn. Just prior to the distance traveled being counted down to zero indicating a turn, an audible means such as a chime or buzzer sounds telling the driver that he/she is approaching an intersection and there is a turn needed in the direction indicated. The first screen 14 also gives a visual indication of the direction the vehicle is to turn. Upon turning, the data screen 20 scrolls to the next segment 21 which shows the present location on the second line and on which street the route is going to take on the first line. Again on the direction or first screen 14, the distance is indicated and the direction arrows tell the vehicle operator to turn left onto Inkster Road which is the name on the first line of the segment of the data display 20.

The route continues and the displays change each time the distance counts down to zero. In the event that the location on the screen is arrived at before the distance goes to zero, the vehicle operator can depress the know-location button 24 which resets the distance to zero and causes the screens 13 to scroll to the next segment and, under proper control, updates the distance of the segment 21. The strength of the system is that the distance sensor 28 as is found in most vehicles is extremely accurate, far more than most other routing inputs and sensors, so that the distance to be traveled can be relied upon. It is found that the distance sensor 28 has an error of 0.2% to 0.3%.

Figure 5:
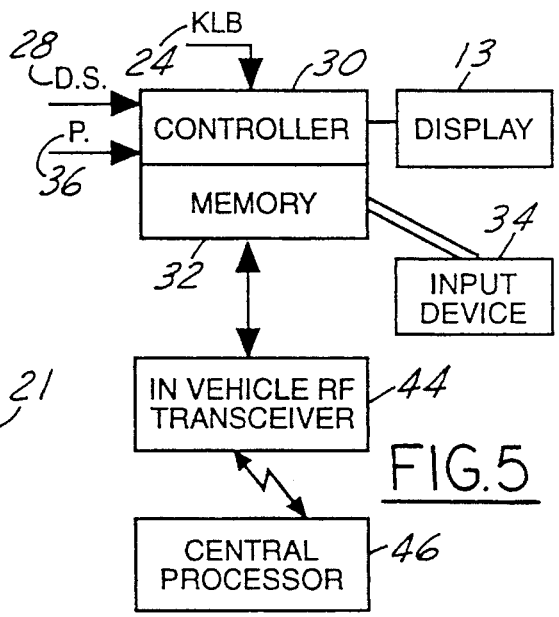
FIG. 5 is a block diagram of another embodiment of the basic display control system of the preferred embodiment.

Referring to FIG. 5, there is illustrated in block diagrammatic form, an additional enhancement or second embodiment of the system of FIG. 3. In this system to the memory/controller 30/32 is added an in-vehicle radio or RF transceiver 44. This allows communication to and from a central processor 46 for assistance in route planning. When this system is used, the central processor 46 provides routing segment 21 to take and may take into account any known route changes required by detours, accidents, etc. The route is transmitted from the central processor 46 and is stored in the memory/controller 30/32 of the system. The controller 30 receives the distance sensor 28 signals and power 36 from the vehicle to operate the system. The RF transceiver 44 communicates on cellular systems, spread spectrum telecommunications systems or any similar systems.

Figure 6:
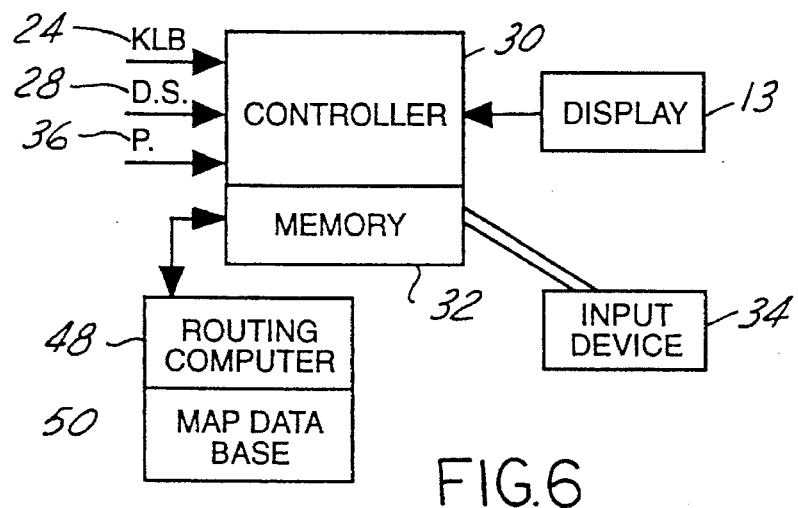
FIG. 6 is a block diagram of still another embodiment of the basic display control system of the preferred embodiment.

Referring to FIG. 6, there is illustrated in block diagrammatic form, an additional enhancement or a third embodiment of the system of FIG. 3. In this system to the memory/controller 30/32 is added an in-vehicle routing computer 48 and map data base 50. The operator provides the map data base 50 which may be in the form of a compact disc or other means and which is interrogated by the routing computer 48 to generate the route. In this embodiment, the vehicle operator enters the initial location and the destination location. Depending upon the sophistication of the routing computer 48, the vehicle operator may have to enter both the initial location and the destination in geodetic coordinates or maybe by common names such as City Airport or Joe Muer's Restaurant. The routing computer 48 and the map data base 50 compute the route to be taken and load the route into the memory 32 and the controller 30 ultimately displays the routing segments 21 as indicted above.

The difference between FIG. 5 and FIG. 6 is a matter of choice and each may well be the first addition to the system of FIG. 3. It is the purpose of this invention to be able to create the system which the vehicle operator wants. In the system of FIG. 5, the vehicle operator has communication time fees and central processor fees. In return he is able to get the latest and most up to date routing information. This of course depends upon the different inputs to the central processor 46 such as road maintenance information, detours, accident information, traffic density to name but a few inputs. In high traffic density areas, the communication time between the vehicle and the central processor 46 can become significant. The route is transmitted from the central processor 46 and is stored in the memory/controller 30/32 of the system. The controller 30 receives the distance sensor signals 28 and power 36 from the vehicle to operate the system. The RF transceiver 44 communicates on cellular systems, spread spectrum telecommunications systems or any similar systems.

In the system of FIG. 6, the vehicle operator has to maintain one or more map data bases 50 which cover a certain geographic area. If the vehicle goes beyond the limits of the map data base 50, then the vehicle operator must, through the input device 34 add the necessary segments 21 to complete his route. In short, the selection of either system is a matter of cost and availability.

Figure 7:
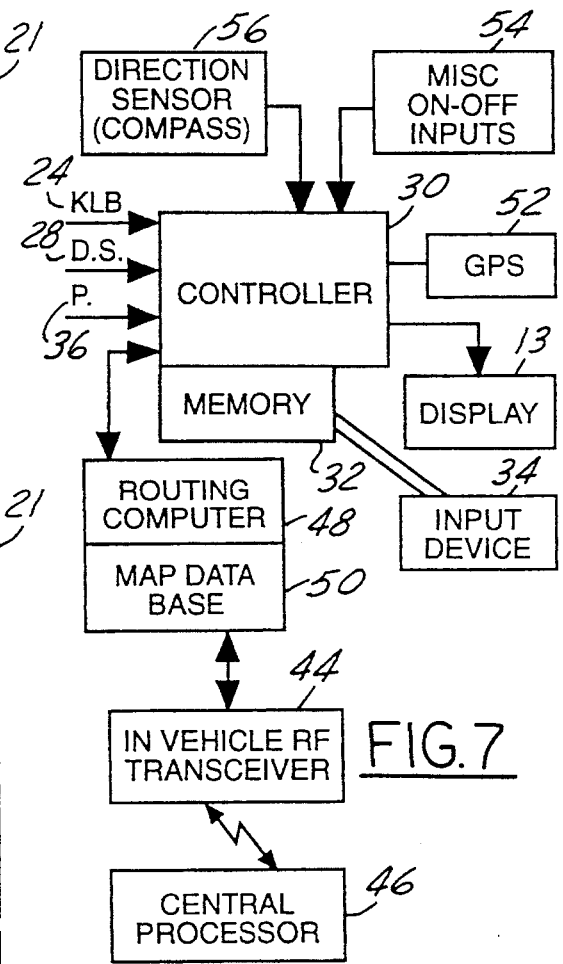
FIG. 7 is a block diagram of a yet another embodiment of the basic display control system of the preferred embodiment.

Referring to FIG. 7, an optional GPS device 52 is added to make this a GPS based system. A routing computer 48 and map data base 50 are added to the system of FIG. 5. If the GPS device 52 is activated, the GPS is used to provide the initial location and may also indicate to the controller 30 when the vehicle has strayed from its route. In that situation, the controller 30 can be programmed to inform the vehicle operator and so that he may get back on course. The map data base 50 is used to generate the several segments 21 of the route as explained with FIG. 6 and cause the segments to be displayed on the display 13. The RF transceiver 44 when activated, can provide route updates which are beyond the capability of the map data base 50 stored in the vehicle unit.

In this system, the use of the RF transceiver 44 may be under the control of the vehicle operator so that he has control of the payment of communication fees. The routing computer 48 can be programmed to indicate when the attached map data base 50 does not have the sufficient scope to complete the routing and that it is necessary to communicate with the central processor 46 for additional routing. In the alternative, the design of the system may also be such that the vehicle operator is not aware when the capacity of the map data base 50 is exceeded and the routing computer 48 "calls up" the central processor 46. In addition, if desired, the vehicle operator can program the routing computer 48 to make sure that he is directed by the best route. Further miscellaneous on-off inputs 54 are provided which may be to change the back lighting of the unit 10 when the head lights are on or if a direction sensor or compass device 56 is added and when the rear window defroster is activated causing an additional electromagnet field to be generated which interferes with the operation of the compass 56, the compass output is corrected.

Figure 8:
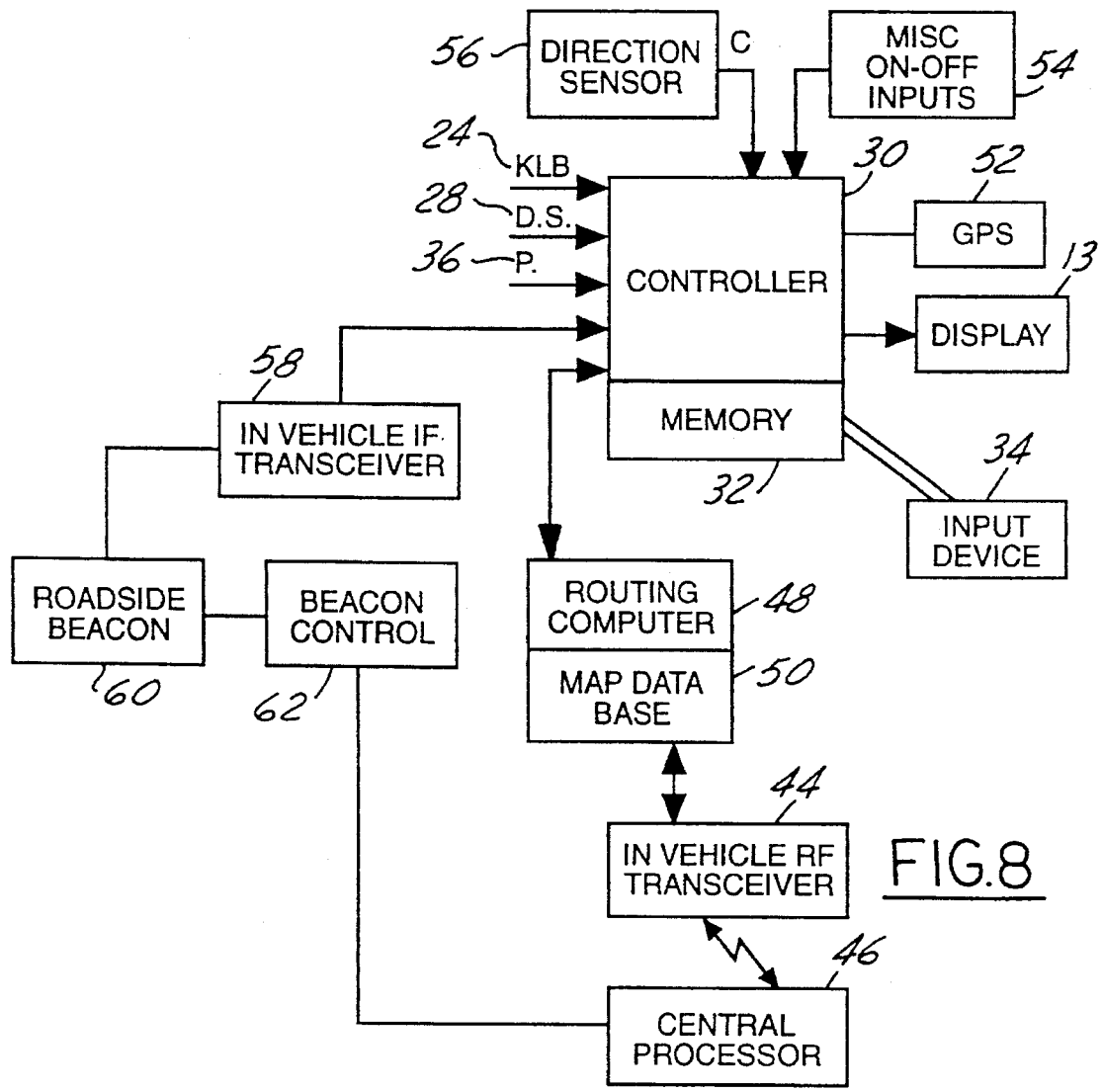
FIG. 8 is a block diagram of a still yet another embodiment of the basic display control system of the preferred embodiment.

Referring to FIG. 8 the system of FIG. 7 is enhanced by providing the Ali-Scout™ control by the IR transceiver 58. This aspect of the system provides communication to roadside beacons 60 and beacon controllers 62 which provide information to the vehicle about the routing by the next segment 21 links of the vehicle route. An important part of the IR roadside beacons 60 is that all vehicles passing a roadside beacon receive routes at the same time. Thus the IR communication link can not be saturated as can RF links which communicate to each individual vehicle. By adding the IR transceiver and hence the IR communication link, the overall Ali-Scout™ system will not be saturated because of the increasing number of vehicles which can happen with the addition of only the in-vehicle radio or RF transceiver 44.

Thus, the system now has the capability of using its own "canned" routes as described in FIGS. 3 and 4; modifying them with GPS information as to latitude and longitude coordinates of the present location as described in FIG. 7, generating mapping information as described in FIG. 6. Finally, adding the IR transceiver 58 and the capability of roadside beacons 60 the various segments of the route can be modified in real-time to provide the "best" route that is known. The central processor 46 can receive updates as to road conditions and provide further modifications to the selected route segments. When the Ali-Scout™ components 58–62 are added, the controller 30 will receive as its first or priority route information, the information received from the beacons 60 and when it determines that the beacon information is through because the vehicle has gone beyond the beacon network, it will then address the routing computer 48 in a manner similar as explained for FIG. 7.

As explained above, one method of loading selected routes into the memory 32 is by means of the keyboard illustrated in FIG. 2. Other methods of loading selected routes in the display control unit 10 are by means of a map data base and routing algorithm running on a personal computer. The routing algorithm automatically generates routes and stores them into the computer until they are downloaded to the display control unit 10. Downloading can be done in or out of the vehicle via a hardwired serial link through the connector or other means Adding a speech or voice digitizer to the display control unit 10 for converting a spoken audio signal into a corresponding electrical signal will allow the display control unit 10 to operate in response to some simple voice or audio commands. Such a system is described in the previously indicated U.S. Pat. No. 5,274,560 entitled "Sensor Free Vehicle Navigation System Utilizing A Voice Input/output Interface For Routing A Driver From His Source Point To His Destination Point".

There has thus been shown and illustrated an expandable intelligent vehicle highway navigation system 11 that is capable of being modified and enhanced to provide the degree of navigation required by the vehicle operator. In its simplest form, the vehicle operator loads into the memory 32 of the display control unit 10, the segments 21 of several known routes which he typically takes and means are provided for selection of a desired route. Such a system is good for rental cars and used by the travelers to go from the airport or similar location to various hotels, restaurants, major landmarks, etc. The largest and most complex system, which may be the one illustrated in FIG. 8, requires more vehicle infrastructure and complexity to allow the vehicle operator to go almost anywhere he chooses due to the interface with equipment which are connected by means of wave transmission, IR and/or RF, to the basic system 11. In all systems both visual means such as by a display screens 13 and audio means such as by voice commands emanating from the display control unit 10 assure the vehicle operator that he is "on course".

In summary, from a very simple basic system, the vehicle operator by means of a variety of "building blocks" may create the system to reflect his needs. In addition, the system can be enhanced at a later time by the addition of other "building blocks" to create the "ultimate" system in the vehicle operator's mind.

By the use of the central processor 46, tolls can be collected and billed to a central billing by the transmission of a vehicle identification, messages may be stored in the central processor 46 and when a vehicle addresses the central processor 46, such messages may be transmitted to the vehicle operator. Thus, it is seen how from an independent, stand-alone system, the expandable intelligent vehicle highway navigation system 11 may be enhanced to a whatever degree of sophistication that may be desired.

What is claimed is:

1. An expandable, multi-level intelligent vehicle highway navigation system for a vehicle having an invehicle unit including a wheel pulse input signal generator such as a odometer electronic signal device, and a power supply and an out of vehicle central processing means, the system comprising:

global positioning means for determining the initial and present position in latitude and longitude coordinates of the vehicle;

a memory unit adapted to contain a plurality of addresses, and points of interest representing designation locations identification, said addresses and points of interest identified by latitude and longitude coordinates;

a keyboard for inputting into the memory unit the desired designation identification for selecting a route and the segments thereof for directions from the initial location to the designation location;

radio-frequency means for communication between said memory unit and the central processing means for addressing the central processing means for the generation and transmission of route segments and travel information to said memory unit of the vehicle;

a display unit for displaying graphic symbols indicating the direction of travel of the vehicle for each route segment including the direction of turning and the distance of each segment; including a data display unit for displaying alphanumeric symbols describing the several segments of the route; and a controller adapted to receive the signals generated by the wheel pulse input signal generator, global positioning means and the power supply, said controller for organizing and operating said display unit to present successive segments of the route in response to the distance traveled as measured by the pulses from the wheel pulse input generator.

2. An intelligent vehicle highway navigation system according to claim 1 additionally including an in vehicle infrared transceiver means for communication between the vehicle and roadside infrared beacons for traffic routing information and means in response to said infrared transceiver means receiving a signal to override said routing computer.

3. An intelligent vehicle highway navigation system according to claim 1 wherein said memory unit includes street address ranges, street names, city names and points of interests adapted to be combined to form said segments for directions from the initial location to the destination location.

* * * * *